(12) United States Patent
Harada et al.

(10) Patent No.: US 9,690,983 B2
(45) Date of Patent: Jun. 27, 2017

(54) TASK ASSISTANCE SYSTEM, TASK ASSISTANCE METHOD, AND PROGRAM

(71) Applicants: NEC Corporation, Tokyo (JP); NEC Solution Innovators, Ltd., Tokyo (JP)

(72) Inventors: Hiroo Harada, Tokyo (JP); Katsuyuki Nagai, Tokyo (JP); Kenichi Kaneko, Tokyo (JP); Teppei Takasugi, Tokyo (JP)

(73) Assignees: NEC Corporation, Tokyo (JP); NEC Solution Innovators, Tokyo (JP)

( * ) Notice: Subject to any disclaimer, the term of this patent is extended or adjusted under 35 U.S.C. 154(b) by 10 days.

(21) Appl. No.: 14/401,663

(22) PCT Filed: Feb. 28, 2013

(86) PCT No.: PCT/JP2013/001227
§ 371 (c)(1),
(2) Date: Nov. 17, 2014

(87) PCT Pub. No.: WO2013/171940
PCT Pub. Date: Nov. 21, 2013

(65) Prior Publication Data
US 2015/0139489 A1  May 21, 2015

(30) Foreign Application Priority Data
May 17, 2012 (JP) .................. 2012-113410

(51) Int. Cl.
*G06K 9/00* (2006.01)
*G01B 11/00* (2006.01)
(Continued)

(52) U.S. Cl.
CPC .......... *G06K 9/00355* (2013.01); *G01B 11/00* (2013.01); *G06T 7/73* (2017.01);
(Continued)

(58) Field of Classification Search
USPC ....... 382/100, 103, 106–107, 141, 162, 168, 382/173, 181, 190, 199, 203, 209, 219,
(Continued)

(56) References Cited

U.S. PATENT DOCUMENTS 7,013,290 B2 * 3/2006 Ananian ........... G06F 17/30867
705/26.42
8,860,760 B2 * 10/2014 Chen ..................... G09G 5/397
345/633
(Continued)

FOREIGN PATENT DOCUMENTS

JP 2001-128814 5/2001
JP 2005-141542 6/2005
(Continued)

OTHER PUBLICATIONS

International Search Report and Written Opinion mailed Jun. 4, 2013 in corresponding PCT International Application.

*Primary Examiner* — Seyed Azarian
(74) *Attorney, Agent, or Firm* — Finnegan, Henderson, Farabow, Garrett & Dunner, L.L.P.

(57) ABSTRACT

A task assistance system includes: a location detection unit (101) for setting a sensing plane in a first face side of a display means capable of displaying a plurality of articles and calculating location information of a hand located on the sensing plane or location information of an object different from the hand; a region setting unit (102) for setting a plurality of sensing regions on the sensing plane using the location information of the hand or the location information of the object calculated by the location detection unit (101); and a pass-through region determination unit (104) for determining which one of the plurality of sensing regions a hand extended to the display means from the first face side has passed through using the location information of the
(Continued)

hand calculated by the location detection unit (101), after the region setting unit (102) sets the plurality of sensing regions.

18 Claims, 13 Drawing Sheets

(51) Int. Cl.
*G06T 7/73* (2017.01)
*G08B 13/14* (2006.01)

(52) U.S. Cl.
CPC ............... *G06T 2207/10004* (2013.01); *G06T 2207/30196* (2013.01); *G06T 2207/30241* (2013.01)

(58) Field of Classification Search
USPC ....... 382/224, 232, 254, 274, 276, 287–291, 382/305, 312, 318; 340/568.1; 705/26.42; 701/23; 345/633
See application file for complete search history.

(56) References Cited

U.S. PATENT DOCUMENTS

2002/0156556 A1* 10/2002 Ruffner ................ A01B 69/008
 701/23
2009/0135013 A1* 5/2009 Kushida ................ G06Q 30/02
 340/568.1

FOREIGN PATENT DOCUMENTS

| JP | 2007-323471 | 12/2007 |
| JP | 2009-126660 | 6/2009 |

\* cited by examiner

| SENSING REGION DISCRIMINATION INFORMATION | X-COORDINATE | Y-COORDINATE |
|---|---|---|
| 0001 | 0 ~ 10 | 0 ~ 10 |
| 0002 | 10 ~ 20 | 0 ~ 10 |
| 0003 | 20 ~ 30 | 0 ~ 10 |
| ⋮ | ⋮ | ⋮ |

Fig. 6

| SENSING REGION DISCRIMINATION INFORMATION | FREQUENCY |
|---|---|
| 0001 | 7 |
| 0002 | 13 |
| 0003 | 9 |
| ⋮ | ⋮ |

TASK ASSISTANCE SYSTEM, TASK ASSISTANCE METHOD, AND PROGRAM

CROSS-REFERENCE TO RELATED PATENT APPLICATIONS

This application is a National Stage Entry of International Application No. PCT/JP2013/001227, filed Feb. 28, 2013, which claims priority from Japanese Patent Application No. 2012-113410, filed May 17, 2012. The entire contents of the above-referenced applications are expressly incorporated herein by reference.

TECHNICAL FIELD

The present invention relates to a task assistance system, a task assistance method, and a program.

BACKGROUND ART

As a technology of detecting that a hand has been extended to an article displayed on a shelf, technologies described in Patent Literatures (PTLs) 1 and 2 have been proposed. The technology described in Patent Literature (PTL) 1 calculates the location coordinates of a hand using laser and identifies a shelf accessed by the hand based on this calculation result. In the technology described in Patent Literature (PTL) 2, a plurality of shelves each includes a distance sensor to identify an article accessed by a hand using measurement results of these distance sensors.

CITATION LIST

Patent Literature

PTL 1: Japanese Unexamined Patent Application Publication No. 2007-323471
PTL 2: Japanese Unexamined Patent Application Publication No. 2009-126660

SUMMARY OF INVENTION

Technical Problem

The present inventors thought that in the technologies described in Patent Literatures (PTLs) 1 and 2, when an object other than a hand approached a shelf, it was possible to erroneously sense the object as a hand. Therefore, the present inventors have newly invented the following technology.

Initially, using an image capture device imaging a front of a shelf and a location identification device identifying a location of an article located in a front of the shelf using location coordinates of a first coordinate system, it is sensed that a hand is present in a front of the shelf and the location coordinates of the sensed hand in the first coordinate system are identified.

Further, information where each of a plurality of placement regions included in the shelf is identified using location coordinates of the first coordinate system is previously held. There is held information where, for example, an open face of each of the plurality of placement regions (a face that is open for insertion of a hand to pick up an article) is identified using location coordinates of the first coordinate system.

Then, using the location coordinates of the hand and the identified location coordinates of each of the plurality of placement regions in the first coordinate system, it is determined which one of the placement regions of the shelf the hand has been extended to.

The present inventors have newly found the following problems in the technology applied with such an invention.

To determine which one of the placement regions of the shelf the hand has been extended to, as described above, it is necessary to hold information where each of a plurality of placement regions included in the shelf is identified using location coordinates of the first coordinate system. However, no method for easily forming such information is available.

Accordingly, a problem to be solved by the present invention is to provide a technology of easily forming information for identifying each of a plurality of regions where it is sensed whether a hand has been extended using a coordinate system capable of calculating the location coordinates of the hand.

Solution to Problem

According to the present invention, there is provided a task assistance system including:
location detection means for setting a sensing plane in a first face side of a display means capable of displaying a plurality of articles, and for calculating location information of a hand located on the sensing plane or location information of an object different from the hand;
region setting means for setting a plurality of sensing regions on the sensing plane using the location information of the hand or the location information of the object calculated by the location detection means; and
pass-through region determination means for determining which one of the plurality of sensing regions a hand extended to the display means from the first face side has passed through using the location information of the hand calculated by the location detection means, after the region setting means sets the plurality of sensing regions.

Further, according to the present invention, there is provided a task assistance method executed by a computer, the task assistance method including:
a location detection step of setting a sensing plane in a first face side of a display means capable of displaying a plurality of articles and calculating location information of a hand located on the sensing plane or location information of an object different from the hand;
a region setting step of setting a plurality of sensing regions on the sensing plane using the location information of the hand or the location information of the object calculated in the location detection step; and
a pass-through region determination step of determining which one of the plurality of sensing regions a hand extended to the display means from the first face side has passed through using the location information of the hand calculated in the location detection step, after the region setting step sets the plurality of sensing regions.

Further, according to the present invention, there is provided a program causing a computer to function as:
location detection means for setting a sensing plane in a first face side of a display means capable of displaying a plurality of articles, and for calculating location information of a hand located on the sensing plane or location information of an object different from the hand;
region setting means for setting a plurality of sensing regions on the sensing plane using the location information of the hand or the location information of the object calculated by the location detection means; and pass-through region determination means for determining which one of the plurality of sensing regions a hand extended to the display means from the first face side has passed through using the location information of the hand calculated by the location detection means, after the region setting means sets the plurality of sensing regions.

Advantageous Effects of Invention

According to the present invention, it is possible to easily form information for identifying each of a plurality of regions where it is sensed whether a hand has been extended in a coordinate system capable of calculating the location coordinates of the hand.

BRIEF DESCRIPTION OF DRAWINGS

The above-described object and other objects as well as features and advantages will become further apparent from the following description of preferred exemplary embodiments when taken with the accompanying drawings in which:

FIG. 6 is a figure schematically illustrating one example of information held by a result storage unit of the present exemplary embodiment;

EXEMPLARY EMBODIMENTS

Exemplary embodiments of the present invention will be described with reference to the drawings.

A system and a device of the present exemplary embodiment are implemented by a CPU of an optional computer, a memory, a program loaded on the memory (including a program previously stored within the memory at a device shipping stage and also a program downloaded from a storage medium such as a CD and the like or a server or the like on the Internet), a storage unit such as a hard disk and the like for storing the program, and an optional combination of hardware and software via a network connection interface. It should be understood to those skilled in the art that regarding the method for realization and the device, various modified examples are possible.

Further, the functional block diagrams used for the description of the present exemplary embodiment illustrate not a structure of hardware units but a block of function units. In these diagrams, description is made so that each device is implemented by a single piece of equipment but the realization method is not limited thereto. In other words, structures physically separated or structures logically separated are employable.

First Exemplary Embodiment

Figure 1:
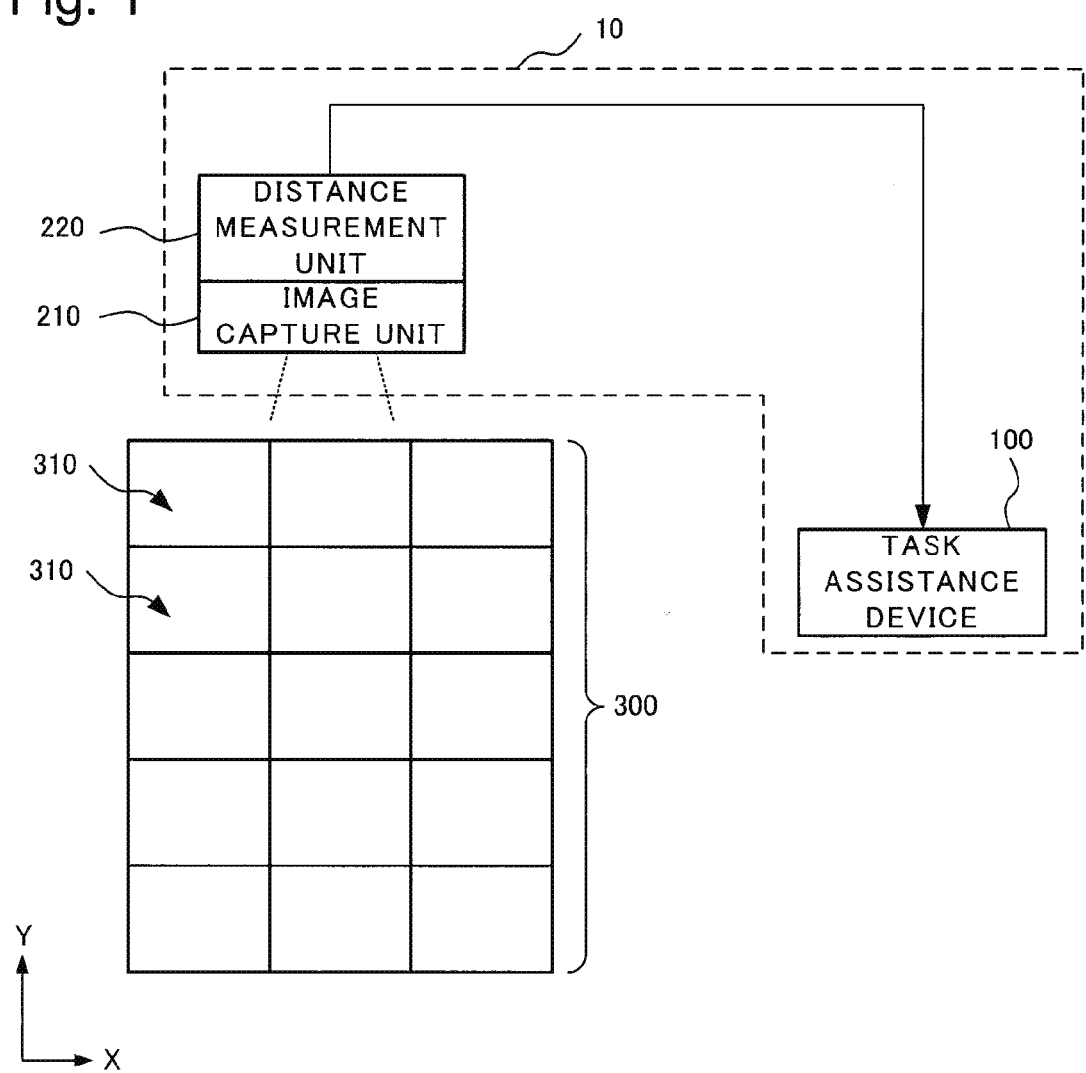
FIG. 1 is a figure illustrating one example of the usage environment of a task assistance system according to the present exemplary embodiment.
Figure 2:
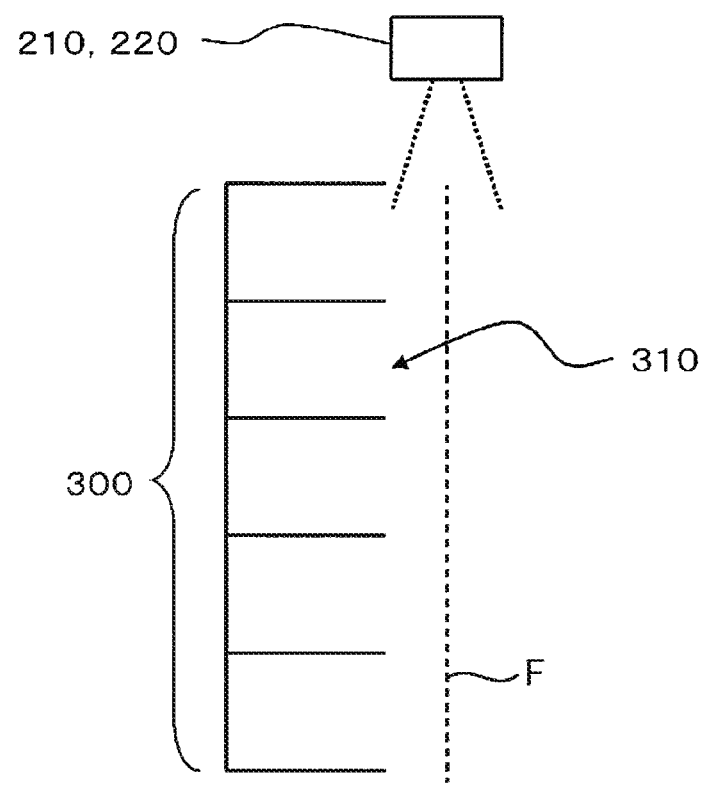
FIG. 2 is a figure illustrating one example of the usage environment of the task assistance system according to the present exemplary embodiment.

FIG. 1 and FIG. 2 each is a figure illustrating one example of the usage environment of a task assistance system 10 according to the present exemplary embodiment. The task assistance system 10 is used together with a display unit 300. FIG. 1 is a figure where the display unit 300 is viewed from the front, and FIG. 2 is a figure where the display unit 300 is viewed from the side.

The display unit 300 includes a plurality of placement regions 310 so as to be able to display a plurality of articles. The display unit 300 is, for example, a shelf having a plurality of stages and has a shape where box-like placement regions 310 are stacked in each of a height direction (i.e., the Y-axis direction of FIG. 1) and a width direction (i.e., the X-axis direction of FIG. 1). However, it is possible that a border between placement regions 310 next to each other laterally has no divider.

The display unit 300 may be structured so as to arrange a plurality of storage containers. In this case, the placement region 310 is a storage container. The storage container may be a tray or a water tank. Further, the display unit 300 may be a single-stage display shelf. In this case, there may be no divider between placement regions 310 next to each other.

The display unit 300 is configured to pick up each of a plurality of articles disposed in the placement region 310 from a front (i.e., a first face side). In FIG. 1, the front side with respect to the paper plane is the front (the first face side), and in FIG. 2, the right side in the figure is the front (the first face side). In the example illustrated in FIG. 2, the front (the first face side) of the placement region 310 is open, and when a hand is extended from this region being open (hereinafter, referred to as an "open face") into the placement region 310, an article disposed in the placement region 310 can be picked up.

Then, the task assistance system 10 according to the present exemplary embodiment will be described. Initially, an outline thereof is described below.

The task assistance system 10 calculates location information of a hand located in the front (the first face side) of the display unit 300. The location information of the hand is calculated as location coordinates in a preset coordinate system. For example, as illustrated in FIG. 1, the location coordinates of a hand is calculated in a two-dimensional coordinate system (the location of the origin is a design matter) where a width direction of the display unit 300 is designated as the X-axis direction and a height direction of the display unit 300 is designated as the Y-axis direction.

Then, the task assistance system 10 uses the calculated location information of the hand and then calculates location information for identifying each of a plurality of placement regions 310 in the coordinate system. For example, a user (e.g., an administrator of the system) located in the front (the first face side) of the display unit 300 makes a gesture for tracing an outer periphery of an open face with respect to each of the plurality of placement regions 310 using a hand. The task assistance system 10 uses location information of the hand obtained from such a gesture and calculates location information where the open face of each of the plurality of placement regions 310 is identified in the coordinate system.

Thereafter, the task assistance system 10 uses the calculated location information of each of the plurality of placement regions 310 and location information of a hand of a user (e.g., a customer) calculated thereafter, and then determines which one of the placement regions 310 the hand has been extended to (which one of the placement regions 310 the hand has passed through).

Such a configuration of the task assistance system 10 will be described below in detail.

As illustrated in FIG. 1, the task assistance system 10 includes an image capture unit 210, a distance measurement unit 220, and a task assistance device 100. The image capture unit 210 and the distance measurement unit 220 are mounted so as to sense the front (the first face side) of the display unit 300. The task assistance device 100 acquires image capture data and measurement data from the image capture unit 210 and the distance measurement unit 220, respectively. The task assistance device 100 may be disposed, for example, in a place (e.g., an office) distant from the display unit 300.

In the example illustrated in FIG. 2, the image capture unit 210 and the distance measurement unit 220 are mounted above the display unit 300. In this case, a motion of a person can be inhibited from being prohibited by the image capture unit 210 and the distance measurement unit 220. However, the image capture unit 210 and the distance measurement unit 220 may be mounted in another location when the location is capable of sensing the front (the first face side) of the display unit 300, and these units may be mounted, for example, sideward or downward of the display unit 300.

The image capture unit 210 images the front (the first face side) of the display unit 300. In other words, the image capture unit 210 is mounted so as to be able to image an object located in the front (the first face side) of the display unit 300.

The distance measurement unit 220 calculates a distance from the distance measurement unit 220 to an object (e.g., a hand) located in the front (the first face side) of the arrangement unit 300. The distance measurement unit 220 calculates, for example, a distance from the distance measurement unit 220 to an object (a hand or the like) in the Y-axis direction (refer to FIG. 1). The distance measurement unit 220 is, for example, a distance sensor using infrared light and may be a distance sensor using ultrasonic waves.

The image data generated by the image capture unit 210 and the distance calculated by the distance measurement unit 220 are output to the task assistance device 100.

Figure 3:
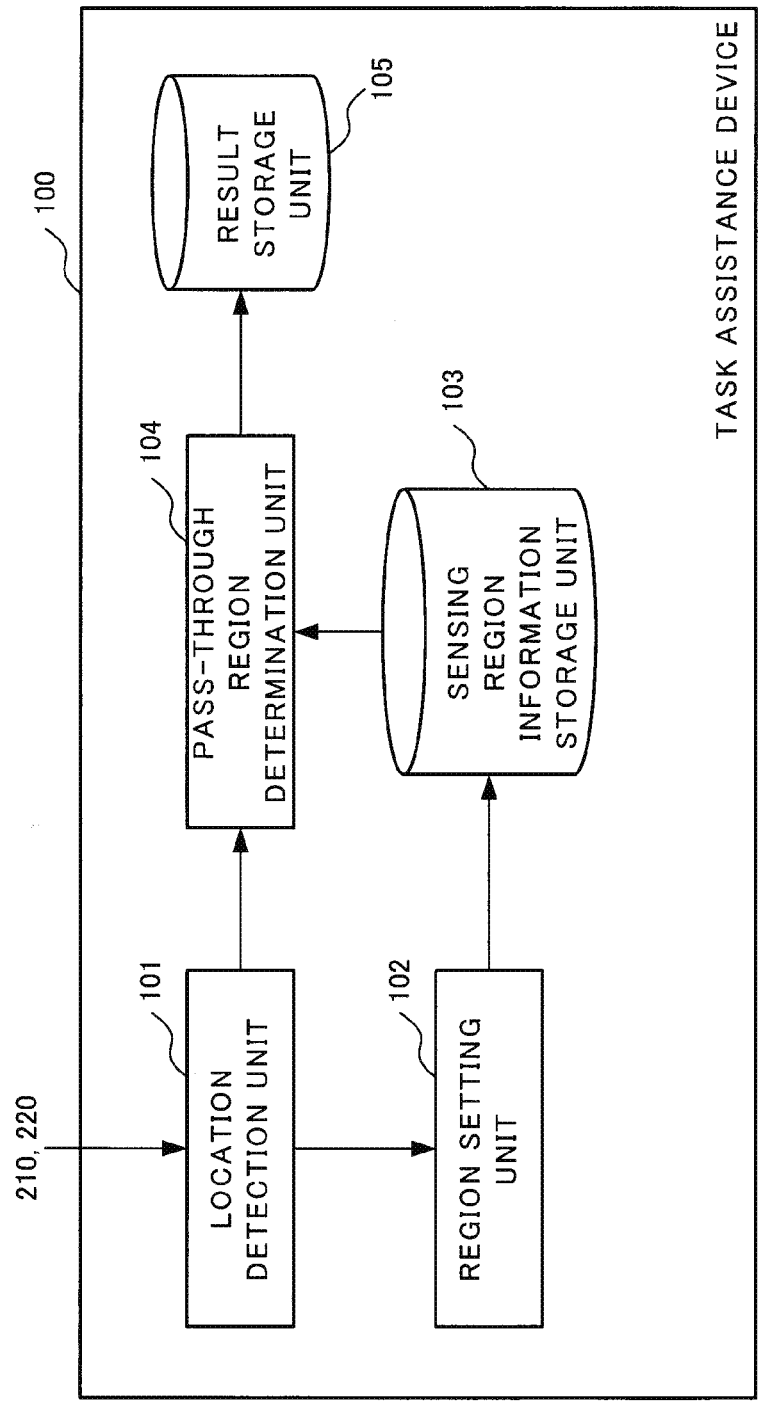
FIG. 3 is a figure illustrating one example of a functional block diagram of a task assistance device of the present exemplary embodiment.

Next, the task assistance device 100 will be described. FIG. 3 illustrates one example of a functional block diagram of the task assistance device 100. As illustrated in FIG. 3, the task assistance device 100 includes a location detection unit 101, a region setting unit 102, a sensing region information storage unit 103, a pass-through region determination unit 104, and a result storage unit 105.

At least one of the sensing region information storage unit 103 and the result storage unit 10 may be included in another device different from the task assistance device 100. Then, the task assistance device 100 may be configured so as to be able to access at least one of the sensing region information storage unit 103 and the result storage unit 10 included in the another device, extract data, and store the data.

The location detection unit 101 calculates location information of a hand located in the front (the first face side) of the display unit 300 using the image data generated by the image capture unit 210 and the distance calculated by the distance measurement unit 220.

Specifically, initially, the location detection unit 101 analyzes the image data obtained via image capture using the image capture unit 210 and extracts a hand from the imaged object using a well-known image recognition technology, for example.

Then, the location detection unit 101 sets a sensing plane in the front (the first face side) of the display unit 300 and calculates location information of a hand on the sensing plane.

The sensing plane can be formed, for example, as a plane (F in FIG. 2) located vertically downward of the image capture unit 210 and the distance measurement unit 220 as illustrated in FIG. 2. The sensing plane F illustrated in FIG. 2 is a plane parallel to the display unit 300. The image capture unit 210 and the distance measurement unit 220 are preferably mounted so that the sensing plane F is sufficiently close to the display unit 300. In the example illustrated in FIG. 2, there is a clearance between the sensing plane F and the first face of the display unit 300 but the plane and the face may be flush with each other.

Preferably, the sensing plane F has at least a size of the first face of the display unit 300 and is set so as to cover the entire first face of the display unit 300 in planar view (when observed from a direction vertical to the paper plane in FIG. 1). Further, the sensing plane F is preferably set so as to be parallel to the first face. Further, the sensing plane F is preferably set, for example, so as to be flush with the first face in the vicinity of the first face of the display unit 300.

Figure 14:
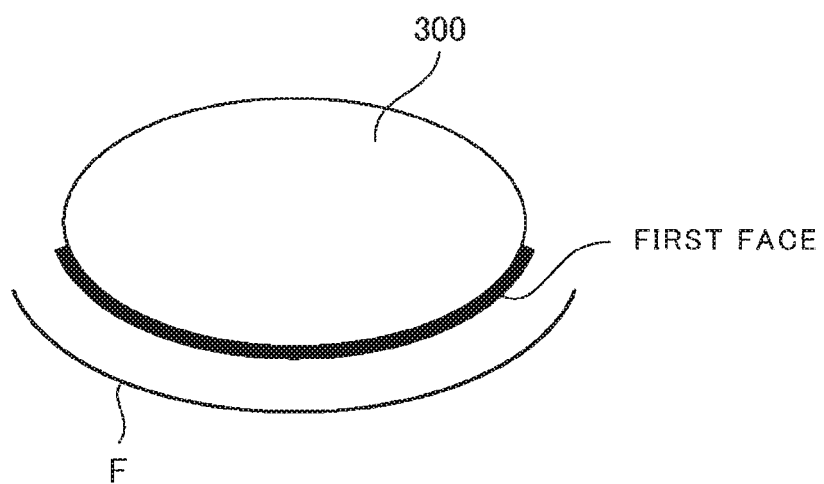
FIG. 14 is a figure for describing one example of a sensing plane F of the present exemplary embodiment.
Figure 15:
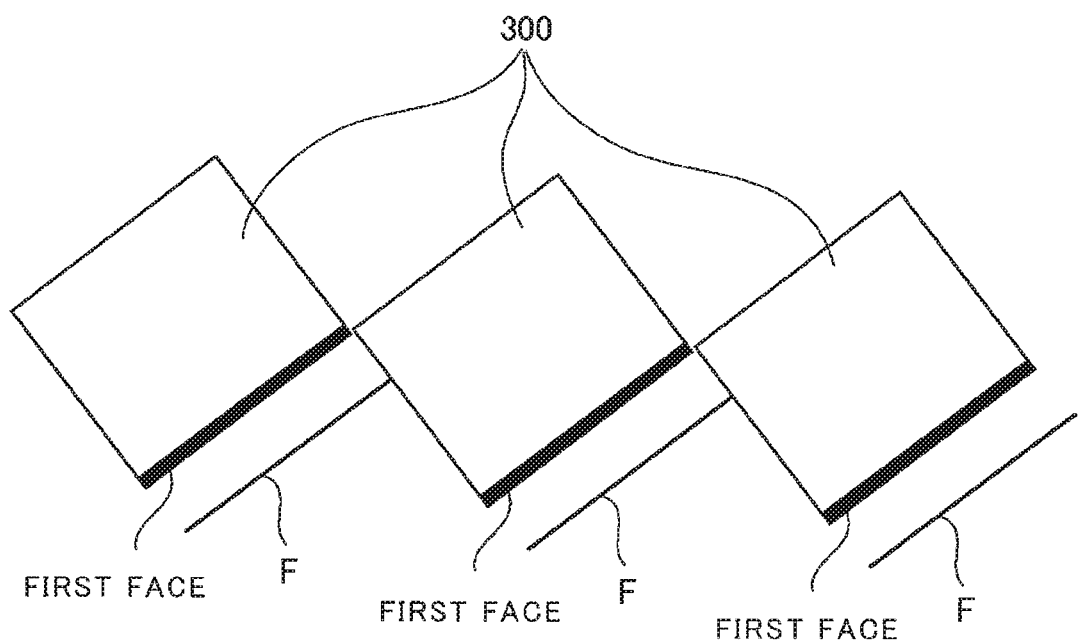
FIG. 15 is a figure for describing one example of the sensing plane F of the present exemplary embodiment.

With reference to FIGS. 14 and 15, other examples of the sensing plane F will be described. FIGS. 14 and 15 each are a figure where the display unit 300 is observed from upward. In the example illustrated in FIG. 14, the first face of the display unit 300 has a curved face. In this case, the sensing plane F can be set so as to have a curved face. In the example illustrated in FIG. 15, the first face of the display unit 300 includes a plurality of discontinuous faces. In this case, the sensing plane F can be set so as to be configured with a plurality of discontinuous faces.

The location detection unit 101 determines a coordinate system, for example, in such a sensing plane F and calculates location coordinates in the coordinate system as location information of a hand on the sensing plane F. The location detection unit 101 determines, for example, a two-dimensional coordinate system (the location of the origin is a design matter) where a width direction of the display unit 300 is designated as the X-axis direction and a height direction of the display unit 300 is designated as the Y-axis direction) as illustrated in FIG. 1 and calculates the location coordinates of the hand in the coordinate system. Hereinafter, the coordinate system is referred to as a sensing plane coordinate system.

A method for calculating the location coordinates of a hand in the sensing plane coordinate system may include, for example, the following.

The location detection unit 101 calculates an angle of a straight line connecting the image capture unit 210 and a hand on the sensing plane F in a real space (e.g., an angle between the straight line and a straight line extending in the Y-axis direction), for example, using a location (a location of the X-axis direction) of a hand in image data obtained via image capture using the image capture unit 210 and a distance calculated by the distance measurement unit 220 (e.g., a distance of the Y-axis direction from the distance measurement unit 220 to the hand). For example, the center of the image data may be set as the origin (O point) of this angle. In this case, an angle where the hand is present in the center (origin) of the image data is 0°. Of course, another point may be set as the origin.

Then, the location detection unit 101 calculates the location coordinates of the hand in the sensing plane coordinate system, using the distance calculated by the distance measurement unit 220 (e.g., a distance of the Y-axis direction from the distance measurement unit 220 to the hand), the calculated angle, and settings of the sensing plane coordinate system (an origin location, the location coordinates of the distance measurement unit 220 in the coordinate system, and the like).

In this manner, the location detection unit 101 detects a hand located in the front (the first face side) of the display unit 300 and also calculates location information (location coordinates in the sensing plane coordinate system) of the detected hand on the sensing plane F.

The region setting unit 102 sets a plurality of regions on the sensing plane F using the location information of the hand calculated by the location detection unit 101. The plurality of regions is set, for example, so as to correspond to the respective open faces of a plurality of placement regions 310. Corresponding to the open face means that locations and lengths of the X-axis direction and the Y-axis direction are equal or are substantially equal.

For example, a user (e.g., an administrator of the system) operates the task assistance system 10 and then activates a region setting mode for setting a plurality of regions on the sensing plane F. Then, while the mode is activated, the user makes a gesture, for example, for tracing an outer periphery of the open face of each of a plurality of placement regions 310 using a hand in the front (the first face side) of the display unit 300. While such a gesture is made, the image capture unit 210 and the distance measurement unit 220 continue to generate image data and calculate a distance as described above, respectively, to output these data to the task assistance device 100. Then, the location detection unit 101 detects a hand located in the front (the first face side) of the display unit 300 using these data and also calculates location information of the detected hand on the sensing plane F. The region setting unit 102 sets a plurality of regions on the sensing plane F using the thus-obtained location information of the hand.

The region setting unit 102 identifies a moving path of a hand on the sensing plane F, for example, using the location information of the hand calculated by the location detection unit 101. Then, the region setting unit 102 sets a plurality of sensing regions on the sensing plane F using the identified moving path of the hand on the sensing plane F.

Figures 4, 5:
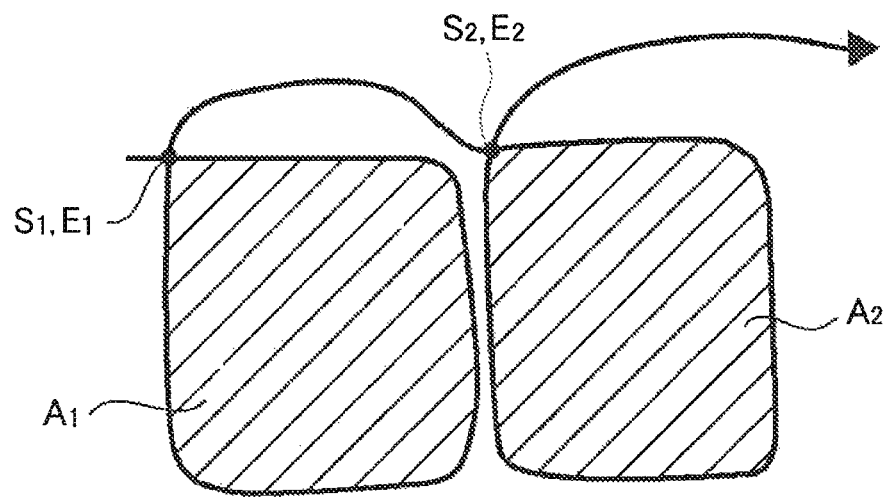
FIG. 4 is a figure for describing one example of processing where the task assistance device of the present exemplary embodiment sets a detecting region.
FIG. 5 is a figure schematically illustrating one example of information held by a sensing region information storage unit of the present exemplary embodiment.

It is assumed that, for example, the region setting unit 102 has identified a moving path of a hand on the sensing plane F as illustrated in FIG. 4. The paper plane is equivalent to the sensing plane F and an arrow is the moving path of the hand (this assumption is the same as in FIGS. 8 to 13). The region setting unit 102 identifies a moving path of a hand on the sensing plane F as illustrated in FIG. 4 and thereafter identifies a setting start location Sn and a setting end location En from the moving path of the hand. Then, the region setting unit 102 sets a region surrounded by the moving path of the hand on the sensing plane F from the setting start location Sn to the setting end location En as a sensing region An.

In the example illustrated in FIG. 4, the region setting unit 102 detects intersections from the moving path of the hand and identifies the intersections as setting start locations S1 and S2 and setting end locations E1 and E2. When a plurality of setting start locations Sn and a plurality of setting end locations En are identified in a serial moving path of a hand as seen in the example illustrated in FIG. 4, the region setting unit 102 can set, among moving paths (this term includes a moving order), a region surrounded by the moving path of the hand from the setting start location Sn to the setting end location En appearing immediately thereafter as one sensing region An.

Thereafter, the region setting unit 102 identifies the thus-set sensing region An in a sensing plane coordinate system. Then, the region setting unit 102 stores information where each sensing region An is identified in the sensing plane coordinate system on the sensing region information storage unit 103 illustrated in FIG. 3.

FIG. 5 schematically illustrates one example of information held by the sensing region information storage unit 103. In the example illustrated in FIG. 5, information (sensing region discrimination information) for discriminating each of a plurality of sensing regions An is associated with an X-coordinate and a Y-coordinate in a sensing plane coordinate system as information for identifying the respective sensing regions An in the coordinate system. In other words, in this example, each sensing region An is defined by a tetragon. For example, a sensing region An of sensing region discrimination information "0001" is a tetragon connecting four points of (X,Y)=(0,0), (0,10), (10,0), and (10,10). Assuming that the sensing region An has a shape other than a tetragon, the sensing region An may be identified in a sensing plane coordinate system using a method different from the illustrated example. It is possible that, for example, the sensing region An is a circle and then is identified using central coordinates and a radius. The shape of the sensing region An is not limited to a tetragon or a circle but may be any other shape such as a polygon, an ellipse, or the like.

Return to FIG. 3. The pass-through region determination unit 104 determines which one of a plurality of sensing regions An a hand (e.g., a hand of a customer) extended to the display unit 300 from the front (the first face side) has passed through using location information of a hand (e.g., a hand of a customer) calculated by the location detection unit 101, after the region setting unit 102 sets the plurality of sensing regions An (after, for example, an administrator of the system operates the task assistance system 10 and activates a customer preference survey mode). Then, for example, the number of pass-through times of the hand (e.g., a hand of a customer) is counted with respect to each sensing region An. The result storage unit 105 holds such count information (refer to FIG. 6), for example.

As described above, a plurality of sensing regions An is associated with a plurality of placement regions 310 included in the display unit 300 on a one-to-one basis. Therefore, when it is determined which one of the plurality of sensing regions An a hand extended to the display unit 300 from the front (the first face side) has passed through, it can be determined which placement region 310 the hand has been extended to.

As described above, according to the present exemplary embodiment, it is possible to easily form information for identifying each of a plurality of regions (sensing regions An) where it is sensed whether a hand has been extended in a coordinate system (sensing plane coordinate system) capable of calculating the location coordinates of the hand.

In the present exemplary embodiment, to detect a motion of a hand of a customer or the like, using the image capture unit 210 and the distance measurement unit 220 disposed in the vicinity of the display unit 300, a motion of a hand (e.g., a hand of an administrator of the system) for setting a sensing region An is detected. Therefore, location information of a hand (e.g., a hand of an administrator of the system) calculated to set the sensing region An is expressed by the same coordinate system as for location information of a hand calculated to detect a motion of a hand of a customer or the like. Therefore, there is no need for processing for converting location information for identifying the sensing region An into the same coordinate system as for location information of a hand calculated to detect a motion of a hand of a customer or the like, which becomes preferable.

Further, in the present exemplary embodiment, initially, a sensing plane F is set based on the first face of the display unit 300 and thereafter, a plurality of sensing regions An is set based on location information of a hand on the sensing plane F and therefore, the first face of the display unit 300 may have a curved face, and even in the case of having a plurality of discontinuous faces, the sensing region An can be easily set.

Second Exemplary Embodiment

The task assistance system 10 of the present exemplary embodiment differs from that of the first exemplary embodiment in a structure of the task assistance device 100. A structure of the display unit 300 is the same as in the first exemplary embodiment.

Figure 7:
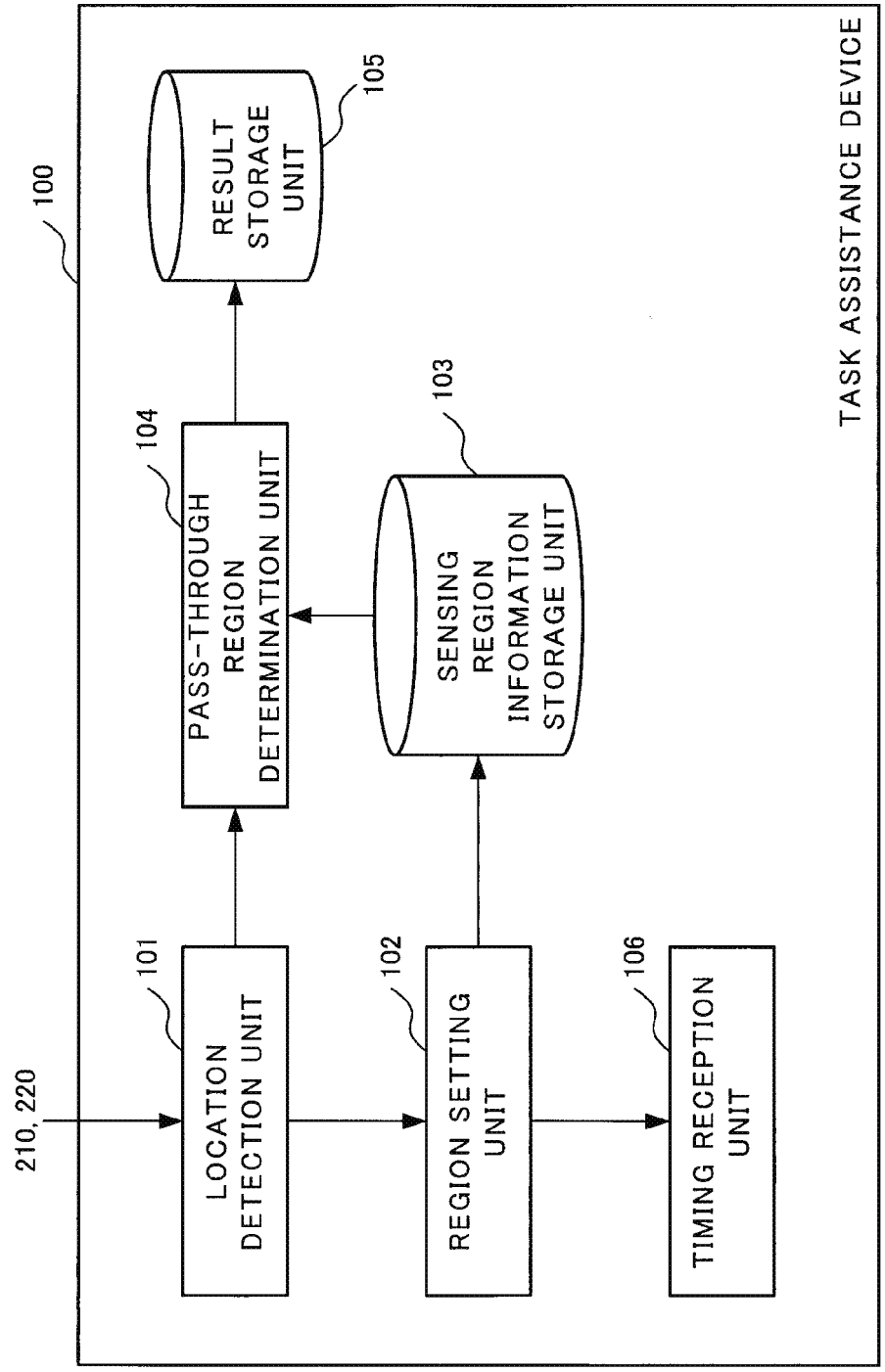
FIG. 7 is a figure illustrating one example of a functional block diagram of the task assistance device of the present exemplary embodiment.

FIG. 7 illustrates one example of a functional block diagram of the task assistance device 100 of the present exemplary embodiment. As illustrated, the task assistance device 100 includes a location detection unit 101, a region setting unit 102, a sensing region information storage unit 103, a pass-through region determination unit 104, a result storage unit 105, and a timing reception unit 106. Configurations of the location detection unit 101, the sensing region information storage unit 103, the pass-through region determination unit 104, and the result storage unit 105 are the same as in the first exemplary embodiment. Configurations of the timing reception unit 106 and the region setting unit 102 will be described below.

The timing reception unit 106 receives an input of information for identifying at least one of a setting start location Sn and a setting end location En in a moving path of a hand on the sensing plane F from a user.

The timing reception unit 106 receives an input of information for identifying at least one of a setting start location Sn and a setting end location En, for example, by a voice input via a microphone disposed in the vicinity of the display unit 300. Details of the input information is a design matter, and the timing reception unit 106 may receive a voice input of "start" as information for identifying the setting start location Sn and a voice input of "end" as information for identifying the setting end location En, for example.

While making a gesture for setting a sensing region An using a hand in the front (the first face side) of the display unit 300, a user (e.g., an administrator of the system) utters, for example, "start" when the hand is located in the setting start location Sn on the sensing plane F. Thereafter, further, the user moves the hand along an outer periphery of the open face of the placement region 310 on the sensing plane F and utters, for example, "end" when the hand is located in the setting end location En on the sensing plane F.

Data where an input thereof is received by the timing reception unit 106 is synchronized in timing with data obtained by image capture using the image capture unit 201 and data obtained by sensing using the distance measurement unit 220. Therefore, it is possible to identify a timing (a location) when the timing reception unit 106 receives an input of information for identifying at least one of a setting start location Sn and a setting end location En in a moving path of a hand on the sensing plane F.

The region setting unit 102 identifies a location at a time when the timing reception unit 106 receives an input of information for identifying a setting start location Sn in a moving path of a hand on the sensing plane F as the setting start location Sn. In the same manner, the region setting unit 102 identifies a location at a time when the timing reception unit 106 receives an input of information for identifying a setting end location En in the moving path of the hand on the sensing plane F as the setting end location En.

The timing reception unit 106 may receive an input of information for identifying the setting start location Sn and the setting end location En via a method other than a voice input.

Such a method also makes it possible that the region setting unit 102 identifies the setting start location Sn and the setting end location En from a moving path of a hand on the sensing plane F as seen in the example illustrated in FIG. 4 and sets a region surrounded by the moving path of the hand on the sensing plane F from the setting start location Sn to the setting end location En as the sensing region An.

Figure 8A:
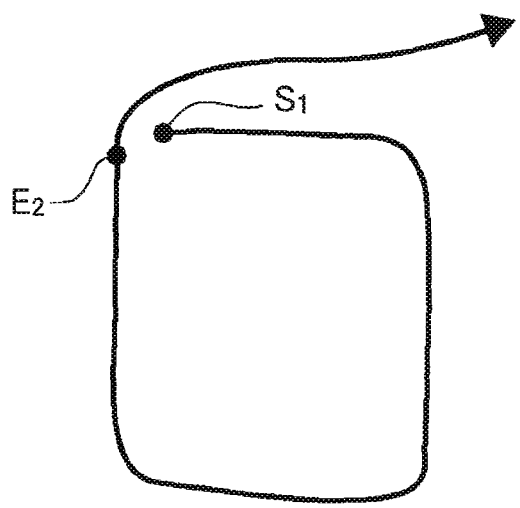
FIG. 8A is a figure for describing one example of processing where the task assistance device of the present exemplary embodiment sets a detecting region.
Figure 8B:
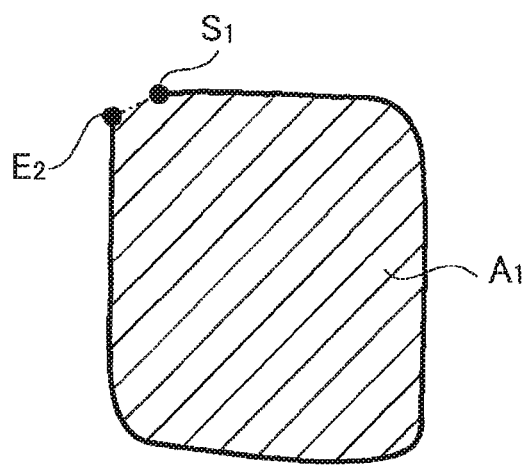
FIG. 8B is a figure for describing one example of processing where the task assistance device of the present exemplary embodiment sets a detecting region.

In the case of this method, as illustrated in FIG. 8A, there may occur a case where locations of a setting start location S1 and a setting end location S2 on the sensing plane F do not coincide with each other. In this case, as illustrated in FIG. 8B, it is possible that the region setting unit 102 sets, as a sensing region A1, a region surrounded by a line (a line expressed by a dotted line in the figure) connecting the setting start location S1 and the setting end location S2 that do not coincide with each other using a straight line or a curved line and a moving path of a hand from the setting start location S1 to the setting end location S1. What line is used for a straight line or a curved line connecting the setting start location S1 and the setting end location S2 that do not coincide with each other is a design matter, and, for example, the region setting unit 102 may connect these locations with the shortest straight line. Of course, any one of these lines needs to be a line that does not completely coincide with the moving path of the hand from the setting start location S1 to the setting end location S1.

In addition, the timing reception unit 106 may receive an input regarding only information for identifying the setting start location Sn. In this case, the region setting unit 102 may identify the setting end location En as described below, for example.

Figure 9:
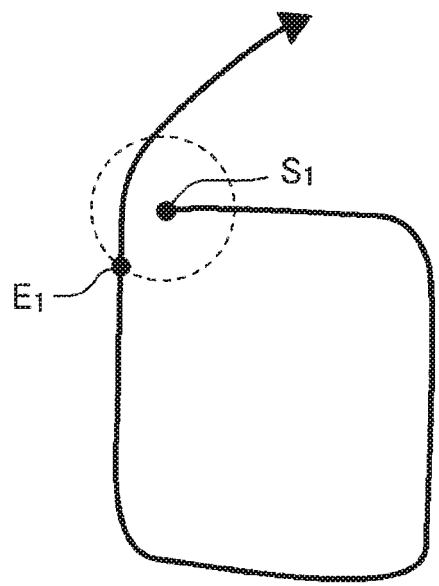
FIG. 9 is a figure for describing one example of processing where the task assistance device of the present exemplary embodiment sets a detecting region.

Initially, when having identified a setting start location Sn in a moving path of a hand based on an input of information for identifying the setting start location Sn received by the timing reception unit 106, the region setting unit 102 sets a circle having a setting start location S1 as the center on the sensing plane F as illustrated in FIG. 9. The radius of the circle is a design matter. Then, the region setting unit 102 may set, as a setting end location E1, a location at a time when the moving path of the hand having started from the center of the circle (the moving path of the hand immediately after passing through the setting start location S1) returns inside the circle after moving outside the circle. Alternatively, the region setting unit 102 may set, as the setting end location E1, a location where the moving path of the hand having returned inside the circle becomes thereafter closest to the setting start location S1 (the center of the circle).

Also, in the present exemplary embodiment, operations/effects that are the same as in the first exemplary embodiment are achievable.

Third Exemplary Embodiment

The task assistance system 10 of the present exemplary embodiment differs from those in the first and second exemplary embodiments in a configuration of the region setting unit 102 of the task assistance device 100. Other configurations in the task assistance device 100 are the same as in the first or second exemplary embodiment. A structure of the display unit 300 of the task assistance system 10 of the present exemplary embodiment is the same as in the first and second exemplary embodiments.

As illustrated in FIGS. 1 and 2, an outer periphery of the open face of the placement region 310 often includes a straight line. In this case, a sensing region An set on the sensing plane F is preferably defined by a straight line. When, for example, an outer peripheral shape of the open face of the placement region 310 is a tetragon, the sensing region An is preferably defined as a tetragon. However, as illustrated in FIG. 4 and the like, a moving path of a hand is difficult to form a straight line and often forms a curved line.

Therefore, the region setting unit 102 of the present exemplary embodiment calculates a conversion moving path where a moving path of a hand on the sensing plane F is partially converted into either a movement to a height direction (the Y-axis direction of FIG. 1) of the display unit 300 or a movement to a width direction (the X-axis direction of FIG. 1) thereof and then sets a plurality of sensing regions An on the sensing plane F using the conversion moving path instead of the moving path of the hand on the sensing plane F.

Figure 10A:
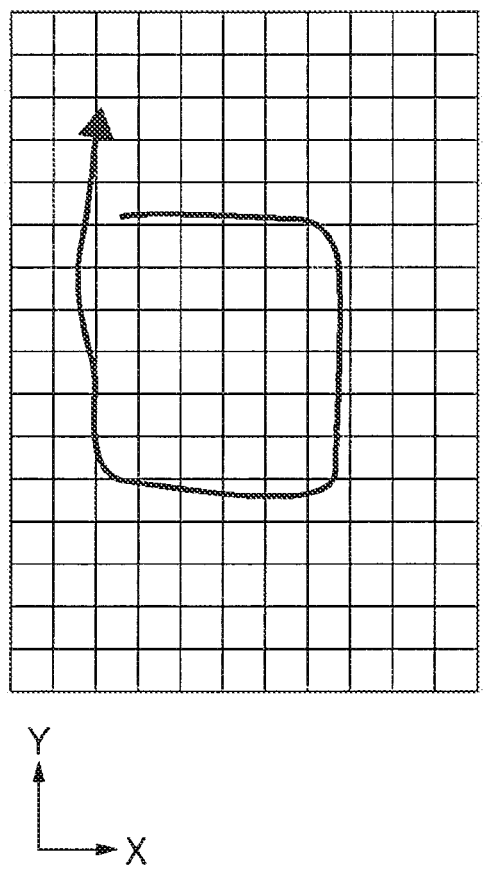
FIG. 10A is a figure for describing one example of processing where the task assistance device of the present exemplary embodiment sets a detecting region.

As illustrated in FIG. 10A, the region setting unit 102 sets, for example, a plurality of grid lines extending in a height direction (the Y-axis direction of FIG. 1) and a width direction (the X-axis direction of FIG. 1) of the display unit 300 on the sensing plane F. The plurality of grid lines is arranged in equal intervals (a design matter). Then, the region setting unit 102 may convert a moving path of a hand (refer to FIG. 10A) on the sensing plane F into a line along the grid lines (refer to FIG. 10B) to calculate a conversion moving path.

A conversion algorism is not specifically limited and, for example, an intersection of one grid line (a longitudinal grid line or a transverse grid line) and a moving path of a hand is converted into the closest intersection of the intersections of the longitudinal grid lines and the transverse grid lines. Then, the region setting unit 102 may set, as a conversion moving path, a line obtained by connecting a plurality of intersections obtained in such a manner with a continuous line using longitudinal grid lines and transverse grid lines.

Figure 10B:
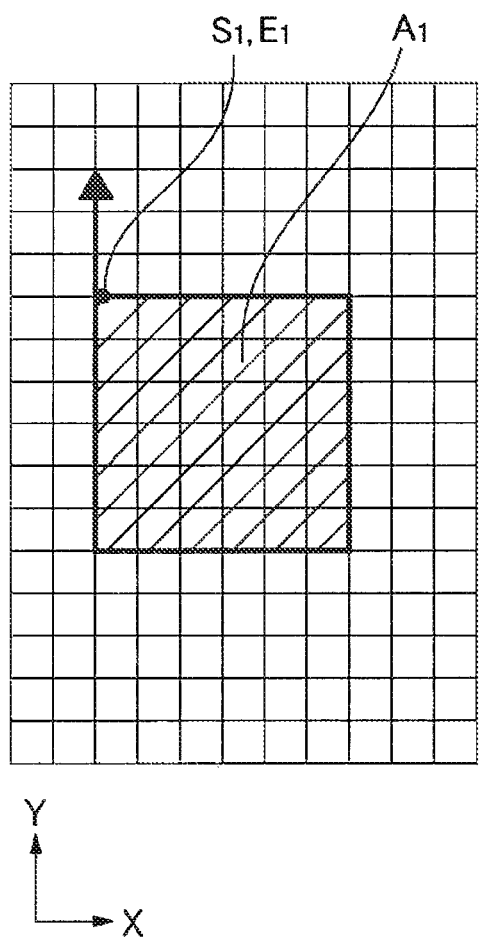
FIG. 10B is a figure for describing one example of processing where the task assistance device of the present exemplary embodiment sets a detecting region.

For example, in the example illustrated in FIG. 10B, the region setting unit 102 detects an intersection from a conversion moving path and identifies the intersection as a setting start location S1 and a setting end location E1. Then, the region setting unit 102 sets a region surrounded by the conversion moving path of the hand on the sensing plane F from the setting start location S1 and the setting end location E1 as a sensing region A1. Instead of this processing, the method described in the second exemplary embodiment is also employable.

In addition, it is possible to employ the configuration of the second exemplary embodiment to calculate a conversion moving path as described below.

Initially, the timing reception unit 106 (refer to FIG. 7) receives an input of information for identifying "a timing of switching a moving path of a hand from a movement to a height direction (the Y-axis direction of FIG. 1) to a movement to a width direction (the X-axis direction of FIG. 1) of the display unit 300" and "a timing of switching a moving path of a hand from a movement to a width direction (the X-axis direction of FIG. 1) to a movement to a height direction (the Y-axis direction of FIG. 1)" (hereinafter, referred to collectively as a switching timing), from a user (e.g., an administrator of the system) making a gesture for identifying each of a plurality of placement regions 310 in the front (the first face side) of the display unit 300, for example.

Figure 11A:
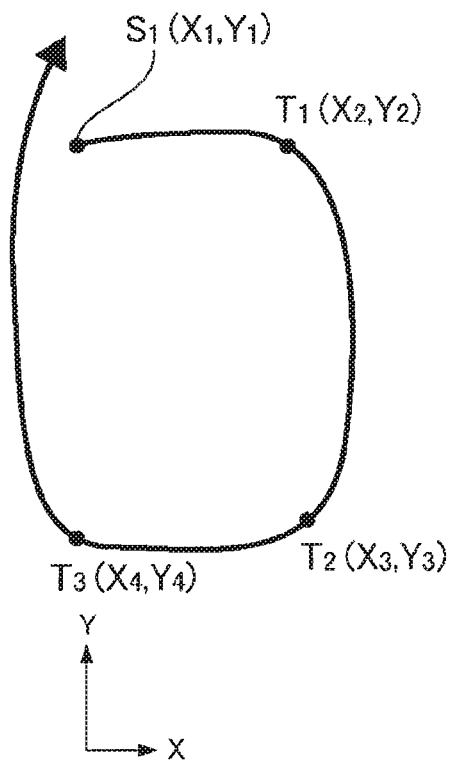
FIG. 11A is a figure for describing one example of processing where the task assistance device of the present exemplary embodiment sets a detecting region.

Then, the region setting unit 102 identifies, as illustrated in FIG. 11A, a setting start location Sn (S1 of the figure) and switching timing locations Tn (T1 to T3 of the figure) in the moving path of the hand, using the information where an input thereof has been received by the timing reception unit 106. The respective coordinates are designated as S1=(x1, y1), T1=(x2,y2), T2=(x3,y3), and T3=(x4,y4).

Thereafter, the region setting unit 102 converts the moving path of the hand connecting S1 and T1 into a straight-line path in a width direction (the X-axis direction of FIG. 1) starting from S1. It is possible that the region setting unit 102 determines, for example, which one of the inclinations of straight lines in a width direction (the X-axis direction) and a height direction (the Y-axis direction) an inclination of the straight line connecting S1 and T1 is close to and makes a conversion to a closer one. In the example illustrated in FIG. 11B, the coordinates of T1' that is a point after conversion of T1 is T1'=(x2,y1). In other words, the x-coordinate is taken over from T1 and the y-coordinate is taken over from S1.

Thereafter, the region setting unit 102 converts the moving path of the hand from T1 to T2 into a straight-line path in a height direction (the Y-axis direction). In the example illustrated in FIG. 11B, the coordinates of T2' that is a point after conversion of T2 is T2'=(x2,y3). In other words, the x-coordinate is taken over from T1' and the y-coordinate is taken over from T2.

Thereafter, the region setting unit 102 converts the moving path of the hand from T2 to T3 into a straight-line path in a width direction (the X-axis direction). In the example illustrated in FIG. 11B, the coordinates of T3' that is a point after conversion of T3 is T3'=(x4,y3). In other words, the x-coordinate is taken over from T3 and the y-coordinate is taken over from T2'.

Thereafter, the region setting unit 102 converts the moving path of the hand from T3 into a straight-line path in a height direction (the Y-axis direction).

Figure 11B:
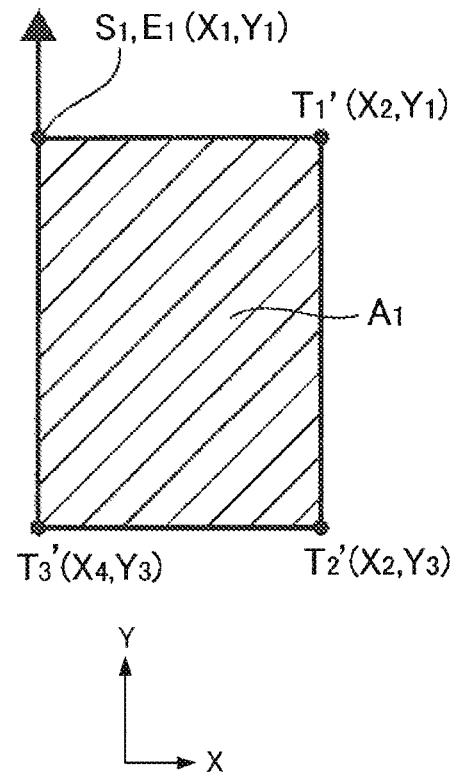
FIG. 11B is a figure for describing one example of processing where the task assistance device of the present exemplary embodiment sets a detecting region.
Figure 12:
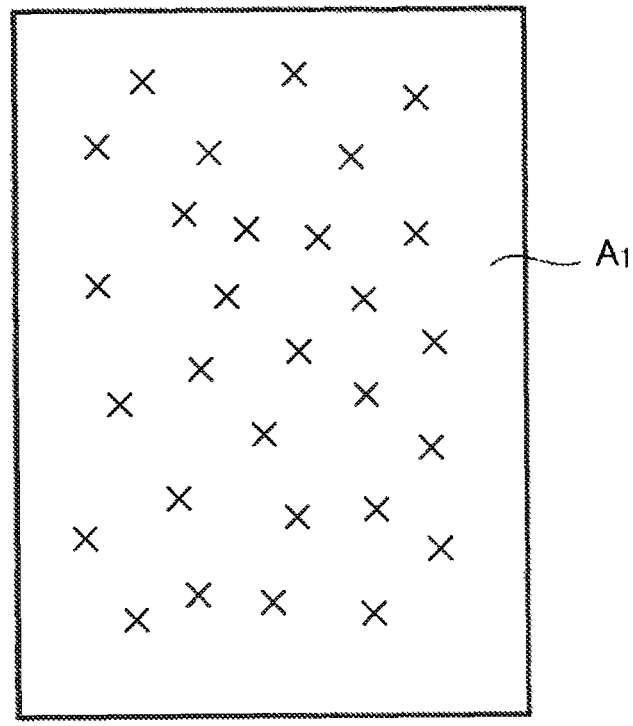
FIG. 12 is a figure for describing one example of processing where the task assistance device of the present exemplary embodiment sets a detecting region.

For example, in the example illustrated in FIG. 11B, the region setting unit 102 detects an intersection from the conversion moving path and identifies the intersection as the setting end location E1. Then, the region setting unit 102 sets a region surrounded by the conversion moving path of the hand on the sensing plane F from the setting start location S1 to the setting end location E1 as the sensing region A1. Instead of this processing, the method described in the second exemplary embodiment is also employable.

Also in the present exemplary embodiment, operations/effects that are the same as in the first and second exemplary embodiments are achievable.

Fourth Exemplary Embodiment

The task assistance system 10 of the present exemplary embodiment differs from those in the first to third exemplary embodiments in a configuration of the region setting unit 102 of the task assistance device 100. Other configurations in the task assistance device 100 are the same as in the first, second, or third exemplary embodiment. A structure of the display unit 300 of the task assistance system 10 of the present exemplary embodiment is the same as in the first to third exemplary embodiments.

In the first to third exemplary embodiments, using a moving path of a hand of a user on the sensing plane F, a region surrounded by the moving path of the hand on the sensing plane F from the setting start location Sn to the setting end location En is set as a sensing region An, but in the present exemplary embodiment, using a method different therefrom, the sensing region An is set.

Initially, a user (e.g., an administrator of the system) operates the task assistance system 10 and activates a region setting mode for setting a plurality of sensing regions An on the sensing plane F. Then, the user performs an input for starting setting one sensing region An and thereafter, repeatedly performs an operation for extending a hand to one placement region 310 from the front (the first face side) of the display unit 300 and withdrawing the hand therefrom for a preset period of time (e.g., 30 seconds) from a preset timing. In other words, for the preset period of time, the user repeatedly performs an operation where the hand is inserted into and withdrawn from one placement region 310.

The region setting unit 102 identifies a plurality of pass-through locations (x in FIG. 12) on the sensing plane F of the hand having passed through the sensing plane F within the preset period of time. Then, the region setting unit 102 sets a region including all of the plurality of identified pass-through locations (x in FIG. 12) as one sensing region An.

Figure 13:
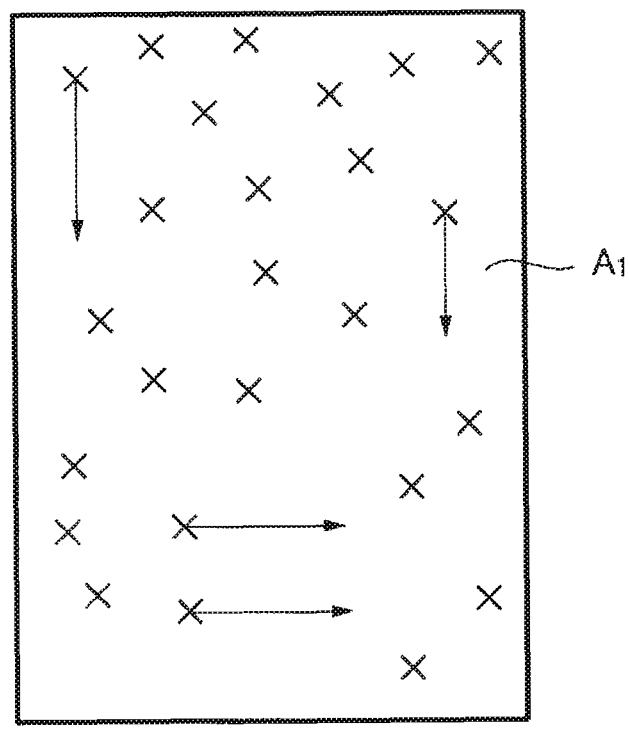
FIG. 13 is a figure for describing one example of processing where the task assistance device of the present exemplary embodiment sets a detecting region.

It is possible that, as illustrated in FIG. 13, the region setting unit 102 identifies a plurality of pass-through locations (x in FIG. 13) on the sensing plane F of the hand having passed through the sensing plane F within the preset period of time and moving paths (arrows in FIG. 13) of the hand on the sensing plane F and then sets a region including all of the plurality of identified pass-through locations (x in FIG. 13) and all the moving paths (arrows in FIG. 13) as one sensing region An.

A method for setting a region including a region including all of a plurality of pass-through locations (x in FIG. 12) is not specifically limited. It is possible that the region setting unit 102 sets, for example, a region having the smallest area among regions including all pass-through locations of the hand as a sensing region An. Alternatively, it is possible that the region setting unit 102 previously holds information indicating a shape (e.g., a tetragon or a circle) of the sensing region An and then sets a region having the smallest area among regions having the same shape including all pass-through locations of the hand as the sensing region An. Alternatively, it is possible that the region setting unit 102 previously holds a model shape (e.g., a tetragon or a circle) of the sensing region An and then sets a region having the smallest area among regions including all pass-through locations of the hand, the regions having a similar figure to the model shape, as the sensing region An. A method for setting a region including all of a plurality of pass-through locations (x in FIG. 13) and all moving paths (arrows in FIG. 13) is also achievable in the same manner.

Also in the present exemplary embodiment, operations/effects that are the same as in the first to third exemplary embodiments are achievable.

Fifth Exemplary Embodiment

The task assistance system 10 of the present exemplary embodiment differs from those in the first to fourth exemplary embodiments in a configuration of the region setting unit 102 of the task assistance device 100. Other configurations in the task assistance device 100 are the same as in the first, second, third, or fourth exemplary embodiment. A structure of the display unit 300 of the task assistance system 10 of the present exemplary embodiment is the same as in the first to fourth exemplary embodiments.

The region setting unit 102 of the present exemplary embodiment is configured to detect, among a plurality of set sensing regions An, those overlapping with each other on the sensing plane F. This processing can be performed using information for identifying each of a plurality of sensing regions An in a sensing plane coordinate system.

When sensing regions An overlapping with each other exist, the region setting unit 102 corrects information for identifying these sensing regions An in a sensing plane coordinate system so as not to overlap with each other. Then, the region setting unit 102 stores the corrected information on the sensing region information storage unit 103. Using the corrected information, the pass-through region determination unit 104 determines which one of a plurality of sensing regions An a hand extended to the display unit 300 from the first face side has passed through. A correction algorism is not specifically limited and, for example, the region setting unit 102 may correct regions overlapping with each other so as to be equally divided into two parts.

Also in the present exemplary embodiment, operations/effects that are the same as in the first to fourth exemplary embodiments are achievable.

Further, a plurality of sensing regions An can be set so as not to overlap with each other and therefore, a disadvantage where an error occurs in processing of the pass-through region determination unit 104 executed after the above setting is avoidable.

Sixth Exemplary Embodiment

In the present exemplary embodiment, a user (e.g., an administrator of the system) uses a designated object (e.g., a pointer) instead of a hand to make a gesture for identifying a plurality of sensing regions An. Then, the task assistance system 10 calculates location information of the designated object and sets a plurality of sensing regions An using the calculated result.

Such a task assistance system 10 of the present exemplary embodiment differs from those in the first to fifth exemplary embodiments in configurations of the location detection unit 101 and the region setting unit 102 of the task assistance device 100. Other configurations in the task assistance device 100 are the same as in any one of the first to fifth exemplary embodiments. A structure of the display unit 300 of the task assistance system 10 of the present exemplary embodiment is the same as in the first to fifth exemplary embodiments.

The location detection unit 101 calculates location information of a designated object located in the front (the first face side) of the display unit 300 using image data generated by the image capture unit 210 and a distance calculated by the distance measurement unit 220.

Specifically, the location detection unit 101 previously holds information (a shape, a size, a color, and the like) indicating characteristics of the designated object. The designated object is an article used by a user (e.g., an administrator of the system) to set a plurality of sensing regions An as described above. It is possible that the designated object is any article and is, for example, a cylindrical pointer. Then, the location detection unit 101 analyzes the image data obtained by image capture using the image capture unit 210 and extracts the designated object from the image data, for example, using a well-known image recognition technology and information indicating characteristics of the designated object. Thereafter, the location detection unit 101 calculates location information of the designated object in the sensing plane coordinate system. The calculation of location information has been described in the first exemplary embodiment and therefore, description thereof here will be omitted.

The region setting unit 102 sets a plurality of sensing regions An on the sensing plane F using the location information of the designated object calculated by the location detection unit 101. The region setting unit 102 employs a technology for setting a plurality of sensing regions An on the sensing plane F using location information of a hand described in the first to fifth exemplary embodiments and then sets a plurality of sensing regions An on the sensing plane F using location information of the designated object instead of location information of the hand.

Also in the present exemplary embodiment, operations/effects that are the same as in the first to fifth exemplary embodiments are achievable.

In the first to fifth exemplary embodiments, location information of a hand calculated by the location detection unit 101 includes two pieces of information that are (1) location information of a hand for setting sensing regions An and (2) location information of a hand to be determined which one of the set sensing regions An the hand has passed through. Therefore, it is necessary to provide means in which the region setting unit 102 can determine which one of (1) and (2) described above the location information of the hand calculated by the location detection unit 101 corresponds to. The task assistance device 100 is configured, for example, to include a region setting mode and a customer preference survey mode and to be able to switch these modes via an operation of the task assistance device 100 by a user. Then, the region setting unit 102 determines that location information of a hand calculated by the location detection unit 101 during the region setting mode is information of (1) and determines that location information of a hand calculated by the location detection unit 101 during the customer preference survey mode is information of (2).

In contrast, in the present exemplary embodiment, the location information of the hand calculated by the location detection unit 101 includes only (2) location information of a hand to be determined which one of set sensing regions An the hand has passed through. Further, the region setting unit 102 can determine that (location information of a designated object calculated by the location detection unit 101)=(information for setting a sensing region An). Therefore, it is unnecessary to provide means in which the region setting unit 102 can determine which one of (1) and (2) described above location information of a hand corresponds to. Further, a task for switching a plurality of modes and the like need not be performed via an operation of the task assistance device 100 by a user, resulting in enhanced workability.

Seventh Exemplary Embodiment

The task assistance system 10 of the present exemplary embodiment differs from those in the first to sixth exemplary embodiments in a configuration of the region setting unit 102 of the task assistance device 100. Other configurations in the task assistance device 100 are the same as in any one of the first to sixth exemplary embodiments.

Figure 16:
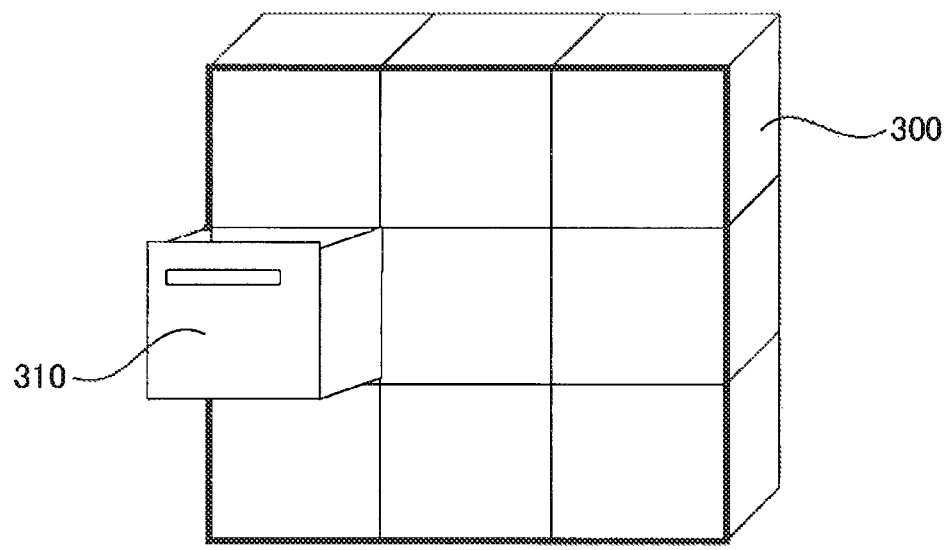
FIG. 16 is a figure for describing one example of processing where the task assistance device of the present exemplary embodiment sets a detecting region.

The display unit 300 of the present exemplary embodiment includes a plurality of drawers as illustrated in FIG. 16. Each of the plurality of drawers functions as each placement region 300.

A user (e.g., an administrator of the system) operates the task assistance system 10 and activates a region setting mode for setting a plurality of sensing regions An on the sensing plane F. Then, the user performs an input for starting setting one sensing region An and thereafter withdraws one drawer to be caused to pass through the sensing plane F.

After the input for starting setting one sensing region An, the location detection unit 101 calculates location information of an object having passed through the sensing plane F. Then, the region setting unit 102 sets a region through which the object has passed as one sensing region An based on the location information calculated by the location detection unit 101.

Also in the present exemplary embodiment, operations/effects that are the same as in the first to sixth exemplary embodiments are achievable.

<<Supplementary Notes>>

According to the first to seventh exemplary embodiments, the following inventions have been also described.

<Invention 1>

A task assistance method executed by a computer, including:

a location detection step of setting a sensing plane in a first face side of a display means capable of displaying a plurality of articles and calculating location information of a hand located on the sensing plane or location information of an object different from the hand;

a region setting step of setting a plurality of sensing regions on the sensing plane by using the location information of the hand or the location information of the object calculated in the location detection step; and a pass-through region determination step of determining which one of the plurality of sensing regions a hand extended to the display means from the first face side has passed through by using the location information of the hand calculated in the location detection step, after the region setting step sets the plurality of sensing regions.

<Invention 2>

The task assistance method according to Invention 1, wherein the region setting step identifies a moving path of a hand or the object on the sensing plane by using the location information of the hand or the location information of the object calculated in the location detection step and also sets a plurality of sensing regions on the sensing plane by using the identified moving path of the hand or the object on the sensing plane.

<Invention 3>

The task assistance method according to Invention 2, wherein the region setting step identifies a setting start location and a setting end location from the identified moving path of the hand or the object on the sensing plane and sets a region surrounded by the moving path of the hand or the object on the sensing plane from the setting start location to the setting end location as the sensing region.

<Invention 4>

The task assistance method according to Invention 3, further including:

a start timing reception step of receiving an input of information for identifying the setting start location from a user, wherein the region setting step identifies a location at a time when the start timing reception step receives the input of information for identifying a setting start location in the moving path of the hand or the object on the sensing plane as the setting start location.

<Invention 5>

The task assistance method according to Invention 4, wherein the start timing reception step receives the input of information for identifying the setting start location by using a voice.

<Invention 6>

The task assistance method according to any one of Inventions 3 to 5, further including:

an end timing reception step of receiving an input of information for identifying the setting end location from a user, wherein the region setting step identifies a location at a time when the end timing reception step receives the input of information for identifying the setting end location in the moving path of the hand or the object on the sensing plane as the setting end location.

<Invention 7>

The task assistance method according to Invention 6, wherein the end timing reception step receives the input of information for identifying the setting end location by using a voice.

<Invention 8>

The task assistance method according to any one of Inventions 3 to 5, wherein the region setting step sets a circle having the setting start location as the center on the sensing plane upon identifying the setting end location and identifies, as the setting end location, a location at a time when the moving path of the hand or the object on the sensing plane immediately after passing through the setting start location returns inside the circle after moving outside the circle.

<Invention 9>

The task assistance method according to any one of Inventions 3 to 8, wherein the region setting step sets, as the sensing region, a region surrounded by a line connecting the setting start location and the setting end location by using a straight line or a curved line when locations of the setting start location and the setting end location on the sensing plane differ from each other and the moving path of the hand or the object on the sensing plane from the setting start location to the setting end location.

<Invention 10>

The task assistance method according to Invention 3, wherein the region setting step identifies an intersection of the moving path of the hand or the object on the sensing plane as the setting start location and the setting end location.

<Invention 11>

The task assistance method according to any one of Inventions 2 to 10, wherein the region setting step calculates a conversion moving path where the moving path of the hand or the object on the sensing plane is partially converted into either a movement to a height direction of the display means or a movement to a width direction thereof and sets a plurality of sensing regions on the sensing plane by using the conversion moving path instead of the moving path of the hand or the object on the sensing plane.

<Invention 12>

The task assistance method according to Invention 11, further including:

a switching timing reception step of receiving, from a user, an input of information for identifying a timing of switching from a movement to a height direction of the display means to a movement to a width direction thereof and a timing of switching from the movement to the width direction to the movement to the height direction, wherein the region setting step performs switching from the movement to the height direction to the movement to the width direction or from the movement to the width direction to the movement to the height direction at a location at a time when the switching timing reception step receives the input of information for identifying the timing of switching in the moving path of the hand or the object on the sensing plane upon calculating the conversion moving path from the moving path of the hand or the object on the sensing plane.

<Invention 13>

The task assistance method according to Invention 12, wherein the switching timing reception step receives the input of information identifying the timing of switching by using a voice.

<Invention 14>

The task assistance method according to Invention 11, wherein the region setting step sets a plurality of grid lines extending in the height direction and the width direction of the display means on the sensing plane upon calculating the conversion moving path from the moving path of the hand or the object on the sensing plane and calculates the conversion moving path by converting the moving path of the hand or the object on the sensing plane into a line along the grid lines.

<Invention 15>

The task assistance method according to Invention 1, wherein the region setting step identifies a pass-through location on the sensing plane of the hand or the object passing through the sensing plane within a predetermined period of time and sets a region including the identified pass-through location as the sensing region.

<Invention 16>

The task assistance method according to Invention 1, wherein the region setting step identifies a pass-through location on the sensing plane of the hand or the object passing through the sensing plane within a predetermined period of time and a moving path of the hand or the object moving in the sensing plane and sets a region including the identified pass-through location and the identified moving path as the sensing region.

<Invention 17>

The task assistance method according to any one of Inventions 1 to 16, wherein the region setting step corrects the sensing regions so as not to overlap with each other when a sensing region overlapping with another sensing region exists among a plurality of the set sensing regions.

<Invention 18>

A program causing a computer to function as:

location detection means for setting a sensing plane in a first face side of a display means capable of displaying a plurality of articles, and for calculating location information of a hand located on the sensing plane or location information of an object different from the hand;

region setting means for setting a plurality of sensing regions on the sensing plane by using the location information of the hand or the location information of the object calculated by the location detection means; and pass-through region determination means for determining which one of the plurality of sensing regions a hand extended to the display means from the first face side has passed through by using the location information of the hand calculated by the location detection means, after the region setting means sets the plurality of sensing regions.

<Invention 19>

The program according to Invention 18, causing the region setting means to identify a moving path of a hand or the object on the sensing plane by using the location information of the hand or the location information of the object calculated by the location detection means, and to set a plurality of sensing regions on the sensing plane by using the identified moving path of the hand or the object on the sensing plane.

<Invention 20>

The program according to Invention 19, causing the region setting means to identify a setting start location and a setting end location from the identified moving path of the hand or the object on the sensing plane and to set a region surrounded by the moving path of the hand or the object on the sensing plane from the setting start location to the setting end location as the sensing region.

<Invention 21>

The program according to Invention 20, causing a computer to further function as: a start timing reception means for receiving an input of information for identifying the setting start location from a user, and the region setting means to identify a location at a time when the start timing reception means receives the input of information for identifying the setting start location in the moving path of the hand or the object on the sensing plane as the setting start location.

<Invention 22>

The program according to Invention 21, causing the start timing reception means to receive the input of information for identifying the setting start location by using a voice.

<Invention 23>

The program according to any one of Inventions 20 to 22, causing a computer to further function as: an end timing reception means for receiving an input of information for identifying the setting end location from a user, and the region setting means to identify a location at a time when the end timing reception means receives the input of information for identifying the setting end location in the moving path of the hand or the object on the sensing plane as the setting end location.

<Invention 24>

The program according to Invention 23, causing the end timing reception means to receive the input of information for identifying the setting end location by using a voice.

<Invention 25>

The program according to any one of Inventions 20 to 22, causing the region setting means to set a circle having the setting start location as the center on the sensing plane upon identifying the setting end location and to identify, as the setting end location, a location at a time when the moving path of the hand or the object on the sensing plane immediately after passing through the setting start location returns inside the circle after moving outside the circle.

<Invention 26>

The program according to any one of Inventions 20 to 25, causing the region setting means to set, as the sensing region, a region surrounded by a line connecting the setting start location and the setting end location by using a straight line or a curved line when locations of the setting start location and the setting end location on the sensing plane differ from each other and the moving path of the hand or the object on the sensing plane from the setting start location to the setting end location.

<Invention 27>

The program according to Invention 20, causing the region setting means to identify an intersection of the moving path of the hand or the object on the sensing plane as the setting start location and the setting end location.

<Invention 28>

The program according to any one of Inventions 19 to 27, causing the region setting means to calculate a conversion moving path where the moving path of the hand or the object on the sensing plane is partially converted into either a movement to a height direction of the display means or a movement to a width direction thereof and to set a plurality of sensing regions on the sensing plane by using the conversion moving path instead of the moving path of the hand or the object on the sensing plane.

<Invention 29>

The program according to Invention 28, causing a computer to further function as: a switching timing reception means for receiving, from a user, an input of information for identifying a timing of switching from a movement to a height direction of the display means to a movement to a width direction thereof and a timing of switching from the movement to the width direction to the movement to the height direction, and the region setting means to perform switching from the movement to the height direction to the movement to the width direction or from the movement to the width direction to the movement to the height direction at a location at a time when the switching timing reception means receives the input of information for identifying the timing of switching in the moving path of the hand or the object on the sensing plane upon calculating the conversion moving path from the moving path of the hand or the object on the sensing plane.

<Invention 30>

The program according to Invention 29, causing the switching timing reception means to receive the input of information for identifying the timing of switching by using a voice.

<Invention 31>

The program according to Invention 28, causing the region setting means to set a plurality of grid lines extending in the height direction and the width direction of the display means on the sensing plane upon calculating the conversion moving path from the moving path of the hand or the object on the sensing plane and to calculate the conversion moving path by converting the moving path of the hand or the object on the sensing plane into a line along the grid lines.

<Invention 32>

The program according to Invention 18, causing the region setting means to identify a pass-through location on the sensing plane of the hand or the object passing through the sensing plane within a predetermined period of time and to set a region including the identified pass-through location as the sensing region.

<Invention 33>

The program according to Invention 18, causing the region setting means to identify a pass-through location on the sensing plane of the hand or the object passing through the sensing plane within a predetermined period of time and a moving path of the hand or the object moving in the sensing plane and to set a region including the identified pass-through location and the identified moving path as the sensing region.

<Invention 34>

The program according to any one of Inventions 18 to 33, causing the region setting means to correct the sensing regions so as not to overlap with each other when a sensing region overlapping with another sensing region exist among a plurality of the set sensing regions.

The invention claimed is:

1. A task assistance system comprising:
a memory that stores a set of instructions and;
a hardware processor configured to execute the set of instructions to:
receive, from a user, an input of information for identifying a setting start location in a voice form;
determine a sensing plane in a first face side of a display capable of displaying a plurality of articles;
determine, for identifying the setting start location, first location information of a first hand located on the sensing plane or second location information of an object different from the first hand;
generate a plurality of sensing regions on the sensing plane based on the first location information of the first hand or the second location information of the object; and determine which one of the plurality of sensing regions a second hand extended to the display from the first face side has passed through based on third location information of the second hand, after determining the plurality of sensing regions.

2. The task assistance system according to claim 1, wherein the hardware processor is further configured to execute the set of instructions to:
determine a moving path of the first hand or the object on the sensing plane based on the first location information of the first hand or the second location information of the object; and
a generate the plurality of sensing regions on the sensing plane based on the identified moving path of the first hand or the object on the sensing plane.

3. The task assistance system according to claim 2, wherein the hardware processor is further configured to execute the set of instructions to:
determine the setting start location and a setting end location from the identified moving path of the first hand or the object on the sensing plane; and
determine a region surrounded by the moving path of the first hand or the object on the sensing plane from the setting start location to the setting end location as the sensing region.

4. The task assistance system according to claim 3, wherein the hardware processor is further configured to execute the set of instructions to:
determine, as the setting start location when the input of information is received, a location of the first hand or the object on the sensing plane.

5. The task assistance system according to claim 3, wherein the hardware processor is further configured to execute the set of instructions to:
determine, when the input information is received, a location of the first hand or the object on the sensing plane as the setting end location.

6. The task assistance system according to claim 3, wherein the hardware processor is further configured to execute the set of instructions to:
determine a circle having the setting start location as a center on the sensing plane; and
determine, as the setting end location, a location of the moving path of the first hand or the object on the sensing plane immediately after the moving path of the first hand or the object passing through the setting start location returns inside the circle after moving outside the circle.

7. The task assistance system according to claim 3, wherein the hardware processor is further configured to execute the set of instructions to:
determine, as the sensing region, a region surrounded by a line connecting the setting start location and the setting end location based on a straight line or based on a curved line when locations of the setting start location and the setting end location on the sensing plane differ from each other, and further based on the moving path of the first hand or the object on the sensing plane from the setting start location to the setting end location.

8. The task assistance system according to claim 3, wherein the hardware processor is further configured to execute the set of instructions to:
determine an intersection of the moving path of the first hand or the object on the sensing plane as the setting start location and the setting end location.

9. The task assistance system according to claim 2, wherein the hardware processor is further configured to execute the set of instructions to:
determine a conversion moving path where the moving path of the first hand or the object on the sensing plane is partially converted into either a movement to a height direction of the display unit or a movement to a width direction thereof; and
generate the plurality of sensing regions on the sensing plane based on the conversion moving path instead of the moving path of the first hand or on the object on the sensing plane.

10. The task assistance system according to claim 9, wherein the hardware processor is further configured to execute the set of instructions to:
receive, from a user, an input of information for identifying a timing of switching from a movement to a height direction of the display to a movement to a width direction of the display and a timing of switching from the movement to the width direction to the movement to the height direction; and
perform switching from the movement to the height direction to the movement to the width direction or from the movement to the width direction to the movement to the height direction at a location when receiving the input of information for identifying the timing of switching in the moving path of the first hand or the object on the sensing plane, after determining the conversion moving path from the moving path of the first hand or the object on the sensing plane.

11. The task assistance system according to claim 10, wherein the hardware processor is further configured to execute the set of instructions to:
receive the input of information identifying the timing of switching by using a voice.

12. The task assistance system according to claim 9, wherein the hardware processor is further configured to execute the set of instructions to:
determine a plurality of grid lines extending in the height direction and the width direction of the display on the sensing plane after determining the conversion moving path from the moving path of the first hand or the object on the sensing plane; and
determine the conversion moving path based on the moving path of the first hand or the object on the sensing plane into a line along the grid lines.

13. The task assistance system according to claim 1, wherein the hardware processor is further configured to execute the set of instructions to:
determine a pass-through location on the sensing plane of the first hand or the object passing through the sensing plane within a predetermined period of time; and
determine a region including the identified pass-through location as the sensing region.

14. The task assistance system according to claim 1, wherein the hardware processor is further configured to execute the set of instructions to:
determine a pass-through location based on the sensing plane of the first hand or the object passing through the sensing plane within a predetermined period of time, and a moving path of the first hand or the object moving in the sensing plane; and
determine a region including the identified pass-through location and the identified moving path as the sensing region.

15. The task assistance system according to claim 1, wherein the hardware processor is further configured to execute the set of instructions to:
adjust the sensing regions so as not to overlap with each other when a sensing region overlapping with another sensing region among a plurality of the set sensing regions.

16. A task assistance method performed by a hardware processor of a computer, the task assistance method including:
receiving, from a user, an input of information for identifying a setting start location in a voice form;
determining a sensing plane in a first face side of a display unit capable of displaying a plurality of articles;
determining, for identifying the setting start location, first location information of a first hand located on the sensing plane or second location information of an object different from the first hand;
generating a plurality of sensing regions on the sensing plane based on the first location information of the first hand or the second location information of the object; and
determining which one of the plurality of sensing regions a second hand extended to the display unit from the first face side has passed through based on third location information of the second hand, after setting the plurality of sensing regions.

17. A non-transitory computer readable medium having stored therein instructions that, when executed by a computer, causes the computer to perform a task assistance method, the method comprising:
receive, from a user, an input of information for identifying a setting start location in a voice form;
determining a sensing plane in a first face side of a display unit capable of displaying a plurality of articles;
determining, for identifying the setting start location, first location information of a first hand located on the sensing plane or second location information of an object different from the first hand;
generating a plurality of sensing regions on the sensing plane based on the first location information of the first hand or the second location information of the object; and
determining which one of the plurality of sensing regions a second hand extended to the display unit from the first face side has passed through based on third location information of the second hand, after determining the plurality of sensing regions.

18. A task assistance system comprising:
storage means for storing a set of instructions and;
processing means for executing the set of instructions for:
receiving, from a user, an input of information for identifying a setting start location in a voice form;
determining a sensing plane in a first face side of a display capable of displaying a plurality of articles;
determining, for identifying the setting start location, first location information of a first hand located on the sensing plane or second location information of an object different from the first hand;
generating a plurality of sensing regions on the sensing plane based on the first location information of the first hand or the second location information of the object; and
determining which one of the plurality of sensing regions a second hand extended to the display from the first face side has passed through based on third location information of the second hand, after determining the plurality of sensing regions.

* * * * *

UNITED STATES PATENT AND TRADEMARK OFFICE
CERTIFICATE OF CORRECTION

| | |
|---|---|
| PATENT NO. | : 9,690,983 B2 |
| APPLICATION NO. | : 14/401663 |
| DATED | : June 27, 2017 |
| INVENTOR(S) | : Hiroo Harada et al. |

Page 1 of 1

It is certified that error appears in the above-identified patent and that said Letters Patent is hereby corrected as shown below:

Claim 2, Column 22, Line 14, "a generate the plurality" should read -- generate the plurality --.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*